(12) United States Patent
Wu et al.

(10) Patent No.: US 9,146,019 B2
(45) Date of Patent: Sep. 29, 2015

(54) LIGHT GUIDE LENS

(71) Applicant: T.Y.C. BROTHER INDUSTRIAL CO., LTD., Tainan (TW)

(72) Inventors: Jin-Hua Wu, Tainan (TW); Ming-Jhia Shih, Tainan (TW)

(73) Assignee: T.Y.C. BROTHER INDUSTRIAL CO., LTD., Tainan (TW)

( * ) Notice: Subject to any disclaimer, the term of this patent is extended or adjusted under 35 U.S.C. 154(b) by 25 days.

(21) Appl. No.: 14/246,334

(22) Filed: Apr. 7, 2014

(65) Prior Publication Data

US 2014/0362588 A1    Dec. 11, 2014

(30) Foreign Application Priority Data

Jun. 6, 2013    (TW) .............................. 102120113 A

(51) Int. Cl.
*F21V 13/04*    (2006.01)
*G02B 17/08*    (2006.01)
*F21S 8/10*    (2006.01)

(52) U.S. Cl.
CPC ............... *F21V 13/04* (2013.01); *F21S 48/225* (2013.01); *F21S 48/2268* (2013.01); *F21S 48/2287* (2013.01); *G02B 17/0856* (2013.01)

(58) Field of Classification Search
CPC ....................................................... F21V 5/008
See application file for complete search history.

(56) References Cited

U.S. PATENT DOCUMENTS

| 7,178,949 B2* | 2/2007 | Bernard et al. ............... 362/300 |
| 7,270,454 B2 | 9/2007 | Amano |
| 2005/0162857 A1* | 7/2005 | Tsukamoto ................... 362/509 |

\* cited by examiner

*Primary Examiner* — Jong-Suk (James) Lee
*Assistant Examiner* — Eric Eide
(74) *Attorney, Agent, or Firm* — Hamre, Schumann, Mueller & Larson, P.C.

(57) ABSTRACT

This invention relates to a light guide lens adapted for guiding light emitted from a light emitting element. The light guide lens includes a base portion disposed on a light axis (L) and including a light incident surface, and a light guide portion surrounding the light axis (L) and disposed on the periphery of the base portion. The light guide portion includes an inner peripheral edge connected to the base portion, an outer peripheral edge opposite to the inner peripheral edge, and at least one light control unit connecting the inner and outer peripheral edges and having first and second light guide sections so as to form a varied light pattern.

4 Claims, 5 Drawing Sheets

LIGHT GUIDE LENS

CROSS REFERENCE TO RELATED APPLICATION

This application claims priority of Taiwanese application no. 102120113 filed on Jun. 6, 2013.

BACKGROUND OF THE INVENTION

1. Field of the Invention

The invention relates to a lens, more particularly to a light guide lens adapted for guiding light emitted from a light emitting element.

2. Description of the Related Art in recent years, a light emitting diode (LED) serving as a light source is popularly used in a vehicular light. Light emitted from the LED is primarily guided by a light guide lens to direct outward. A structural design of the light guide lens determines distribution of a light pattern. Referring to FIG. 1, U.S. Pat. No. 7,270,454 B2 discloses a conventional vehicular lamp that includes a light emitting member 11 and a bowl-shaped lens 12. The lens 12 includes a direct light control unit 121, and a reflected light control, unit 122 surrounding the direct light control unit 121. The reflected light control unit 122 has an uneven front surface 123 and an uneven rear surface 124 opposite to the uneven front surface 123 so that the bowl-shaped configuration of the lens 12 is composed of a plurality of rings that are interleaved with each other. The rings have irregular sections and different sectional dimensions. As a result, the light emitted from the light-emitting member 11 toward the direct light control unit 121 tends to directly pass through the direct light control unit 121 and exit therefrom. The light emitted from the light emitting member 11 toward the reflected light control unit 122 tends to be reflected by the rear surface 124 toward the uneven front surface 123. The optical projection pattern produced by this disclosure includes a plurality of annular bright stripes and annular dim stripes interleaved with each other.

Aside from vehicular lamps, other illumination devices, such as lighting devices, signal light devices, decorative lighting devices, advertising light boxes, etc., used either indoor or outdoor also require a light guide lens to complement a light emitting device for emphasizing the profile of the illumination device. In order to meet the diverse needs of customers, a light guide lens with an innovative structure with, a distinct light guide function is provided.

SUMMARY OF THE INVENTION

Therefore, an object of the present invention is to provide a light guide lens applicable to signal light devices, decorative lighting devices, advertising light boxes, etc., in addition to vehicular lamps.

According to this invention, a light guide lens adapted for guiding light emitted from a light emitting element includes:

a bass portion disposed on a light axis (L) and including a light, incident surface that is adapted for passing of the light emitted from light emitting element therethrough; and a light guide portion surrounding the light axis (L) and disposed on the periphery of the base portion.

The light guide portion includes an inner peripheral edge connected to the base portion, an outer peripheral edge opposite to the inner peripheral edge and disposed distally from the base portion, and at least one light control unit connecting the inner peripheral edge and the outer peripheral edge.

The light control unit has a first light guide section and a second light guide section adjacent to each other. The first light guide section included a first reflecting surface that faces the light emitting element and that has a stepped shape, and a first light exiting surface that faces away from the light emitting element and that has a smooth surface. The first reflecting surface and the first light exiting surface extend from the inner peripheral edge toward the outer peripheral edge. The second, light guide section includes a second reflecting surface facing the light emitting element, a third reflecting surface facing away from the light emitting element, and a second light exiting surface connecting an edge of the second reflecting surface and an edge of the third reflecting surface, and disposed on the outer peripheral edge. The second reflecting surface and the third reflecting surface each has a smooth face and extends from the inner peripheral edge toward the outer peripheral edge.

A portion of the light emitted from the light emitting element enters the first light guide section through the light incident surface and is reflected subsequently by the first reflecting surface as to exit the first light exiting surface.

Another portion of the light emitted from the light emitting element enters the second light guide section through the light incident surface and is reflected multiple times by the second reflecting surface and the third reflecting surface as to exit the second light exiting surface.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENTS

Figure 1:
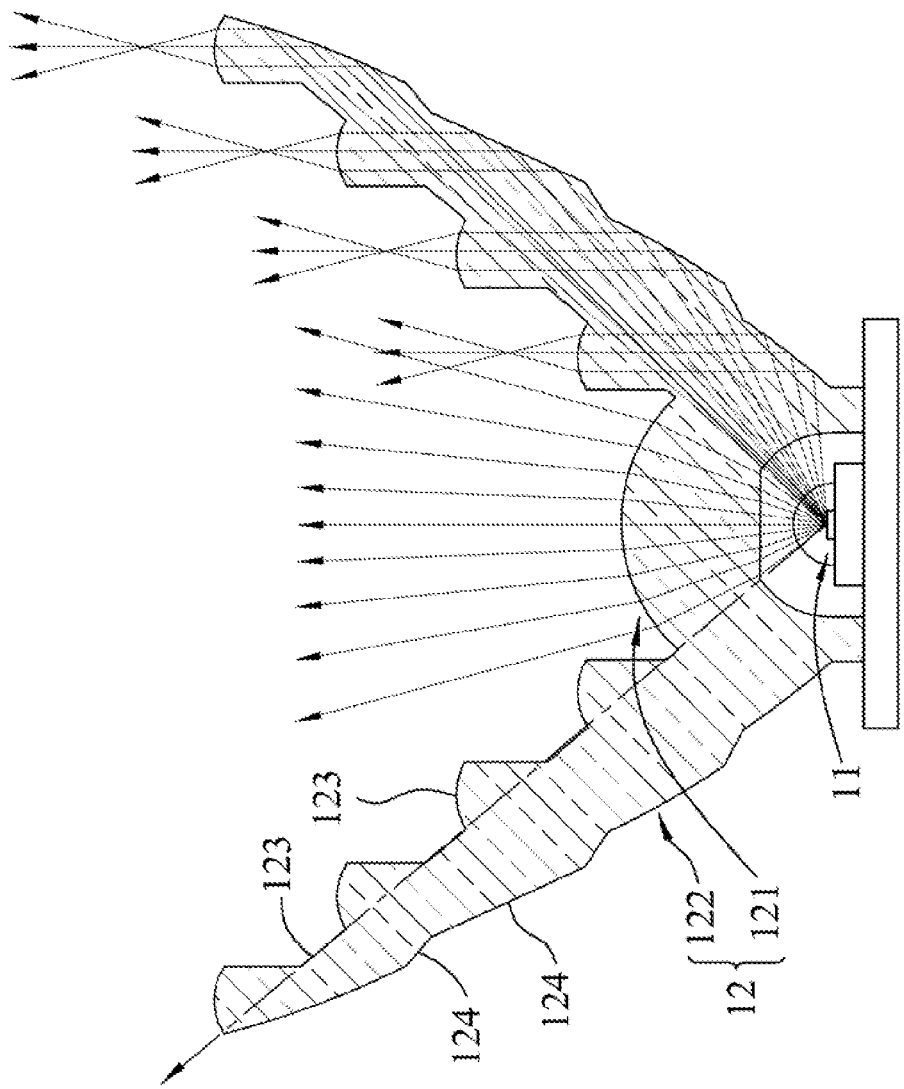
FIG. 1 is a schematic sectional view of a conventional vehicular lamp.
Figure 2:
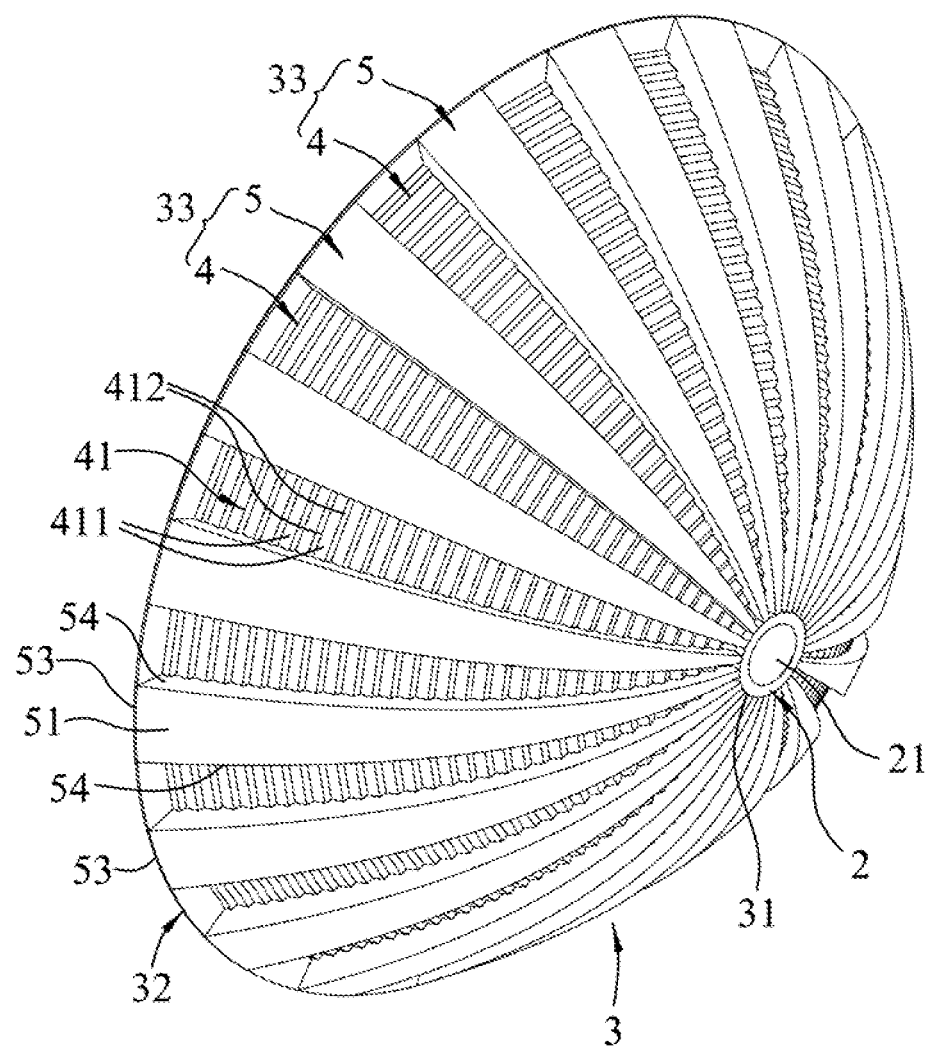
FIG. 2 is a rear perspective view of the preferred embodiment of a light guide lens according to the present invent ion.
Figure 3:
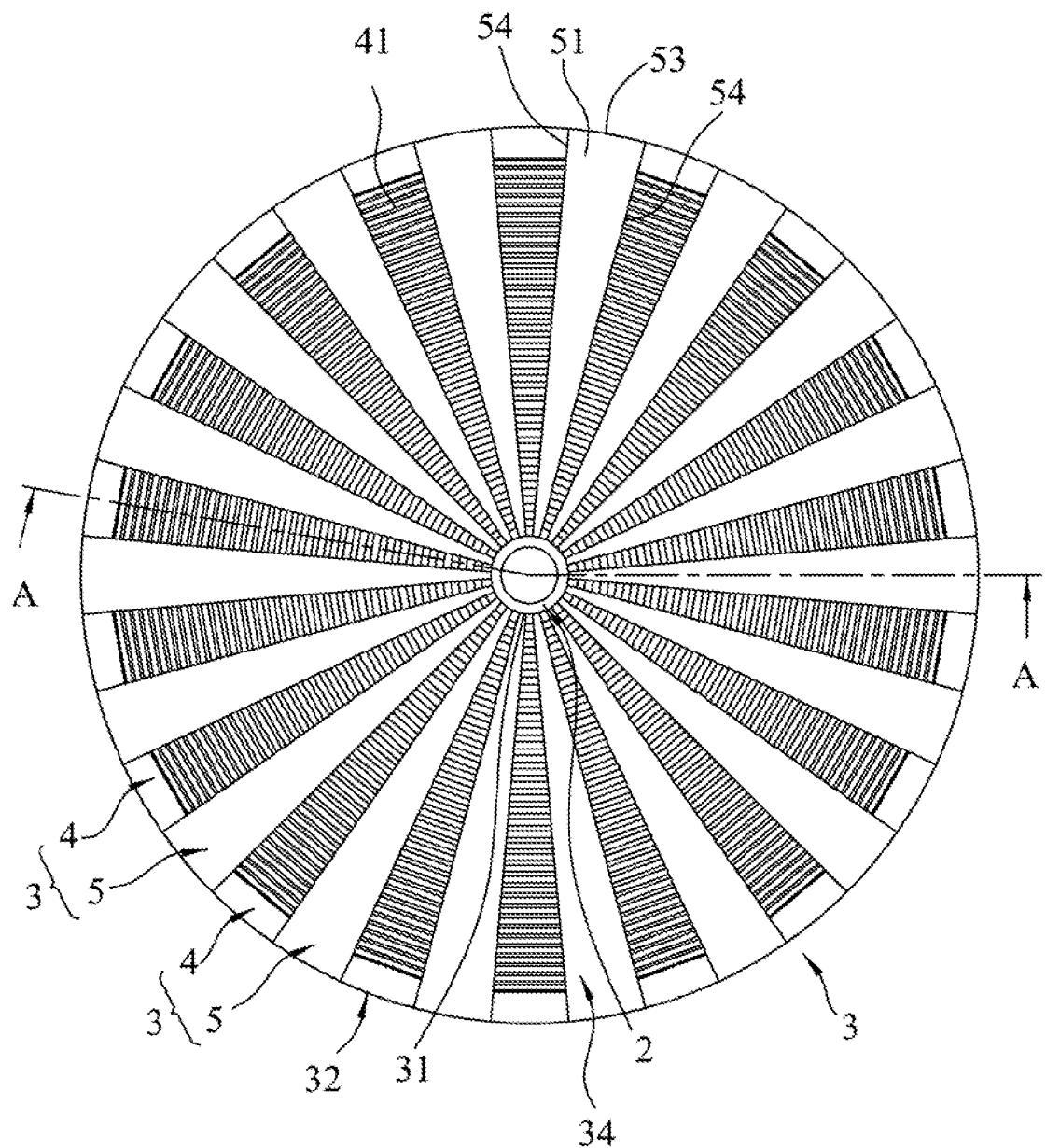
FIG. 3 is a rear view of the preferred embodiment.
Figure 4:
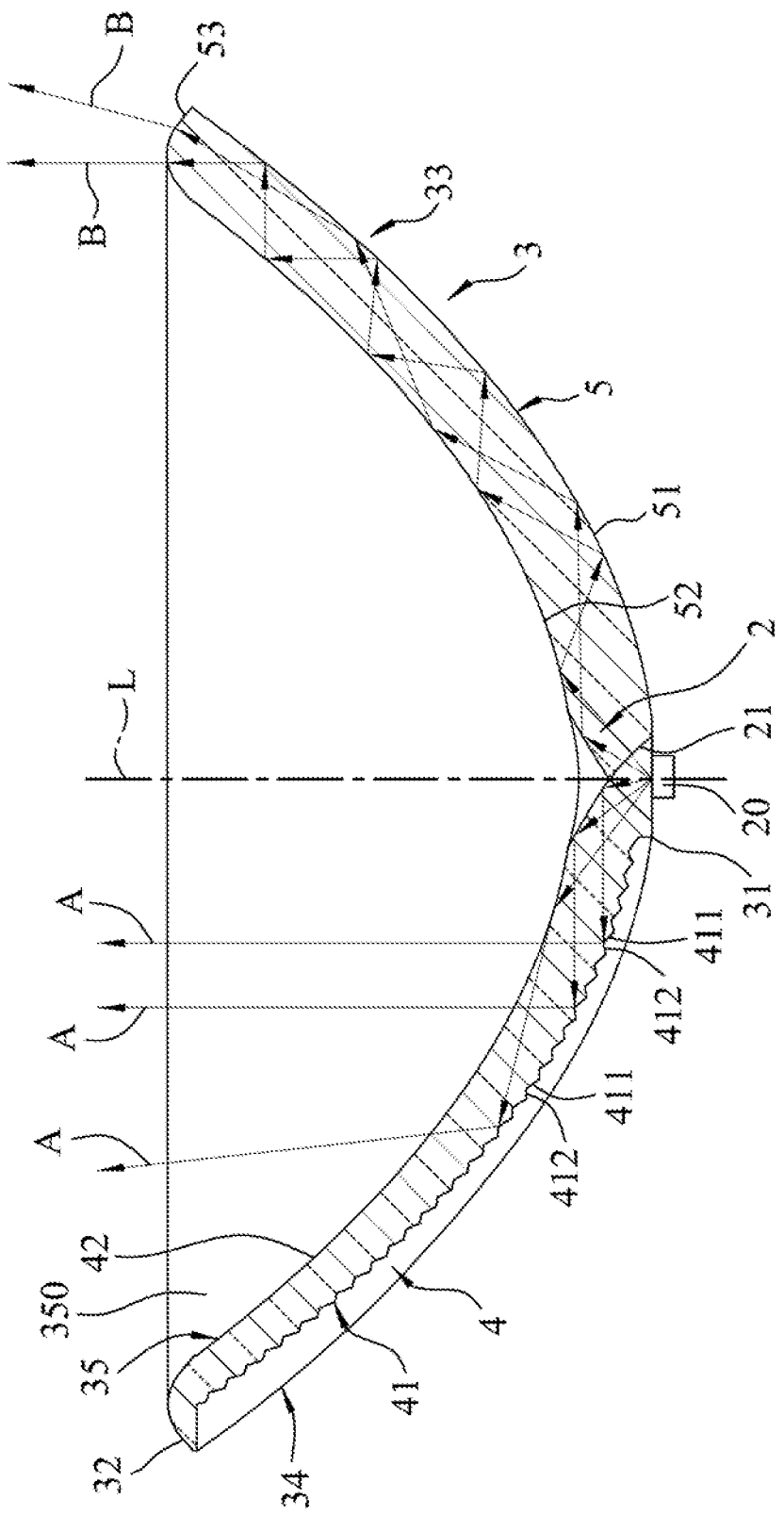
FIG. 4 is a sectional view of FIG. 3 cut along a line A-A shown in FIG. 3.

Referring to FIGS. 2, 3 and 4, the preferred embodiment of a light guide lens according to this invention is shown to be adapted for guiding light emitted from a light emitting element 20. In this embodiment, the light emitting element 20 is exemplified by a light emitting diode (LED). The light guide lens is made of a resin material, is substantially bowl-shaped, and includes a base portion 2 and a light guide portion 3.

The base portion 2 is disposed on a light axis (L) and the light axis (L) passes the central position of the base portion 2. The base portion 2 includes a light incident surface 21 adapted for passing of the light emitted from the light emitting element 20 therethrough. The light incident surface 21 surrounds the light axis (L) and diverges toward the light emitting element 20 so as to form a cone surface.

The light guide portion 3 surrounds the light axis (L) and extends and diverges from the periphery of the base portion 2 in a direction away from the base portion 2. The light guide portion 3 includes an inner peripheral edge 31 connected to the base portion 2 and surrounding the light axis (L), an outer peripheral edge 32 opposite to the inner peripheral edge 31, disposed distally from the base portion 2 and surrounding the light axis (L), and at least one light control unit 33 connecting the inner peripheral edge 31 and the outer peripheral edge 32.

Preferably, the light guide portion 3 of this embodiment includes a plurality of light control units 33 that are connected to one another to form a ring that surrounds the light axis (L). Each of the light control units 33 has a first light guide section 4 and a second light guide section 5 that are adjacent to each other and that extend from the inner peripheral edge 31 toward the outer peripheral edge 32. The first light guide section 4 of each of the light control units 33 is connected to the second light guide section 5 of an adjacent one of the light control units 33. For the entire light guide portion 3, the first light guide sections 4 and the second light guide sections 5 are interleaved with each other.

In this embodiment, the first light guide sections 4 includes a first reflecting surface 41 facing the light emitting element 20 and a first light exiting surface 42 facing away from the light emitting element 20 and having a curvature. Moreover, the first reflecting surface 41 has a stepped shape, and includes a plurality of first areas 411 and a plurality of second areas 412 interleaved with each other. By virtue of the design of the stepped shape, the first reflecting surface 41 has a textured structure; whereas the first light exiting surface 42 has a smooth face.

The second light guide section 5 of this embodiment includes a second reflecting surface 51 facing the light emitting element 20, a third reflecting surface 52 facing away from the light emitting element 20, a second light exiting surface 53 connecting an edge of the second reflecting surface 51 and an edge of the third reflecting surface 52, and disposed on the cuter peripheral edge 32, and a pair of lateral sides 54 that are spaced apart from each other with the second reflecting surface 51 interposed therebetween. Each of the lateral sides 54 connects the second reflecting surface 51 and the first reflecting surface 41 of an adjacent first light guide section 4. Each of the second reflecting surface 51 and the third reflecting surface 52 has a smooth face and extends from the inner peripheral edge 31 toward the outer peripheral edge 32. In addition, the lateral sides 54 also extend from the inner peripheral edge 31 toward the outer peripheral, edge 32, and the distance therebetween gets larger from the inner peripheral edge 31 toward the outer peripheral edge 32.

Moreover, the light guide portion 3 further includes a first surface 34 facing the light emitting element 20 and a second surface 35 facing away from the light-emitting element 20 and defining a lens space 350. The first surface 34 is defined by the first reflecting surfaces 41 in cooperation with the second reflecting surfaces 51 of the light control units 33, and the second surface 35 is defined by the first light exiting surfaces 42 in cooperation with the third reflecting surfaces 52 of the light control units 33.

Figure 5:
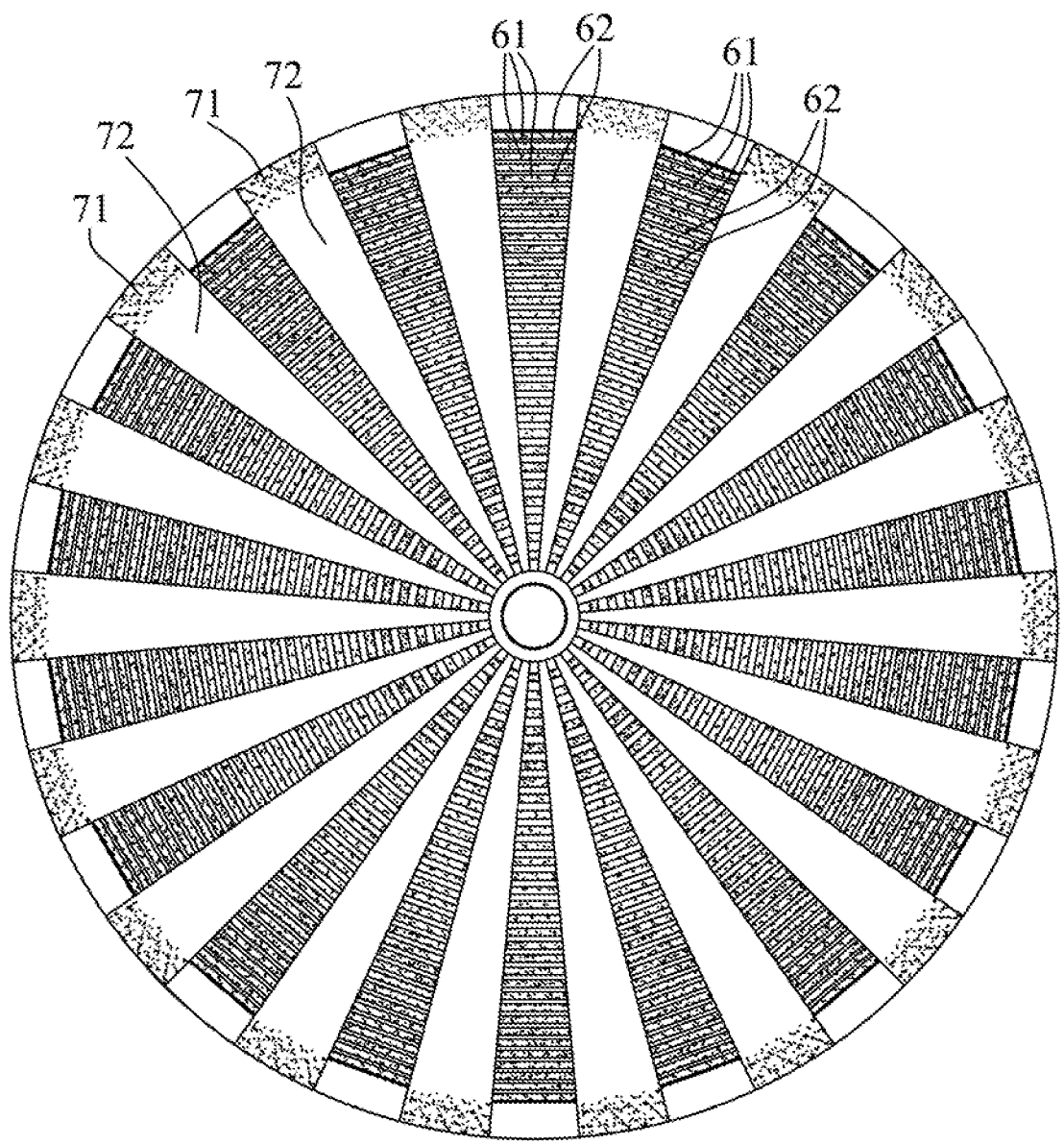
FIG. 5 is a perspective vies for illustrating an optical projection pattern formed by light emitted from a light emitting element and then guided by the preferred embodiment.

Referring to FIGS. 3, 4 and 5, when this invention is put in use, the light emitting element 20 is adapted to be disposed to face the light incident surface 21 of the light guide lens so that light emitted from the light emitting element 20 enters the light guide lens through the light incident surface 21. A portion of the light, which passes through the light incident surface 21, enters the first light guide sections 4 and travels toward the first light exiting surfaces 42, is to be reflected (mainly by total reflections) to be incident upon the first reflecting surfaces 41. Then the light is reflected (mainly by total reflections) again by the first reflecting surfaces 41 as to be emitted out of the first light exiting surfaces 42, as shown by the traveling optical paths (A) in FIG. 4. Furthermore, by this design of the stepped shape of the first reflecting surfaces 41, light entering the first light exiting surfaces 42 forms a light pattern composed of a plurality of first bright stripes 61 (as best shown in dotted areas in FIG. 5) and a plurality of first dim stripes 62 interleaved with each other. The light intensity of the first dim stripes 62 is very small or almost null, and the light intensity of the first dim stripes 62 is smaller than that of the first bright stripes 61.

On the other hand, another portion of the light, which is emitted from the light emitting element 20 and enters the second light guide sections 5 through the light incident surface 21, travels a longer path in the second light guide sections 5 and is reflected multiple times (most of them are total reflections) by the second reflecting surfaces 51 and the third reflecting surfaces 52 of the second light guide sections 5 so as to exit the second light exiting surfaces 53 of the second light guide sections 5, as shown by the traveling optical paths (B) in FIG. 4. In such a manner, the light distribution guided by the second light guide sections 5 includes a plurality of second bright areas 71 at locations corresponding to the second light exiting surfaces 53, and a plurality of second dim areas 72 at locations of the second light guide sections 5 outside the second bright areas 71. The intensity of the light of the second dim areas 72 is very small or almost null, and the intensity of the light of the second dim areas 72 is smaller than that of the light of the second bright areas 71.

In view of the foregoing, the first light guide sections 4 and the second light guide sections 5 are able to guide the light emitted from the light emitting element 20 exemplified by a point light source in the preferred embodiment, to form a special light pattern. The first bright stripes 61 are interleaved with the first dim stripes 62. At each lateral side of each row of the first bright stripes 61 and the first dim stripes 62, a triangular second dim area 72 is disposed, and the second bright area 71 is disposed on the radial outer edge of the second dim area 72. All the first bright stripes 61, the first dim stripes 62, the second bright areas 71 and the second dim areas 72 cooperate to form angularly spaced bright spots in a circle so as to render a radiated and variegated special optical projection pattern, which results in an innovative and amusing spectacle. Moreover, the first light guide sections 4 are used to make light undergo two reflections before coming out of the light guide lens, whereas the second light guide sections 5 are used to make light undergo multiple reflections before exiting the outer peripheral edge 32. So by such an innovative structure, this invention generates an optical functionality and an optical projection pattern which are quite distinct from those generated by the light guide lenses in the prior art. The light guide lens of this invention with the cooperation of the light emitting element 20 is well suited for use in vehicular lamps, other lighting apparatus, signal lights, decorative lightings or advertising light boxes, etc.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A light guide lens adapted for guiding light emitted from a light emitting element, said light guide lens comprising:
  a base portion disposed on a light axis (L) and including a light incident surface adapted for passing ox the light emitted from light emitting element therethrough; and
  a light guide portion surrounding the light axis (L) and disposed on the periphery of said base portion, said light guide portion including
  an inner peripheral edge connected to said base portion, an outer peripheral edge opposite to said inner peripheral edge and disposed distally from said base portion, and at least one light control unit connecting said inner peripheral edge and said outer peripheral edge, said light control unit having a first light guide section and a second light guide section adjacent to each other, said first light guide section including a first reflecting surface that faces toward the light emitting element and that has a stepped shape, and a first light exiting surface that faces away from the light emitting element and that has a smooth face, said first reflecting surface and said first light exiting surface extending from said inner peripheral edge toward said outer peripheral edge, said second light guide section including a second reflecting surface that faces the light emitting element, a third reflecting surface that faces away from the light emitting element, and a second-light exiting surface that connects an edge of said second reflecting surface and an edge of said third reflecting surface, and that is disposed on said outer peripheral edge, said second reflecting surface and said third reflecting surface each having a smooth face and extending from said inner peripheral edge toward said outer peripheral edge;

wherein a portion of the light emitted from the light emitting element enters said first light guide section through said light incident surface and is reflected subsequently by said first reflecting surface as to exit said first light exiting surface, and wherein another portion of the light emitted from the light emitting element enters said second light guide section through said light incident surface and is reflected multiple times by said second reflecting surface and said third reflecting surface as to exit said second light exiting surface.

2. The light guide lens of claim 1, wherein said light guide portion includes a plurality of said light control units that are connected to one another to form a ring that surrounds the light axis (L), said first light guide section of each of said light control units being connected to said second light guide section of an adjacent one of said light control units.

3. The light guide lens of claim 2, wherein said light guide portion diverges from the periphery of said base portion in a direction away from the base position, said light guide portion further including a first surface that faces the light emitting element and a second surface that faces away from the light emitting element and that defines a lens space, said first surface being defined by said first reflecting surfaces in cooperation with said second reflecting surfaces of said light control units, said second surface being defined by said first light exiting surfaces in cooperation with said third reflecting surfaces of said light control units.

4. The light guide lens of claim 3, wherein said light incident surface of said base portion surrounds the light axis (L) and diverges toward the light emitting element so as to form a cone surface.

* * * * *